United States Patent
Larose et al.

(10) Patent No.: US 9,766,329 B2
(45) Date of Patent: Sep. 19, 2017

(54) ALARM AND LOCATION SYSTEM AND METHOD THEREOF

(71) Applicant: Secure Care Products, LLC, Concord, NH (US)

(72) Inventors: Albert Larose, Dracut, MA (US); Doug Richard, Tilton, NH (US); Matthew Cammack, Weare, NH (US); Christopher D. Stevens, Belmont, NH (US); Mike Singer, Concord, NH (US); Sam Corliss, Concord, NH (US); Vijaya Kodali, Nashua, NH (US); Ray Scott, Webster, NH (US)

(73) Assignee: Secure Care Products, LLC, Concord, NH (US)

( * ) Notice: Subject to any disclaimer, the term of this patent is extended or adjusted under 35 U.S.C. 154(b) by 663 days.

(21) Appl. No.: 14/242,260

(22) Filed: Apr. 1, 2014

(65) Prior Publication Data
US 2014/0210611 A1    Jul. 31, 2014

Related U.S. Application Data

(63) Continuation-in-part of application No. 13/426,052, filed on Mar. 21, 2012, now Pat. No. 9,069,057.

(51) Int. Cl.
| | | |
|---|---|---|
| *G01S 1/24* | (2006.01) |
| *G01S 3/02* | (2006.01) |
| *G01S 13/06* | (2006.01) |
| *G08B 25/01* | (2006.01) |
| *G01S 5/06* | (2006.01) |
| *G01S 5/14* | (2006.01) |
| *G08B 21/02* | (2006.01) |

(52) U.S. Cl.
CPC .............. *G01S 13/06* (2013.01); *G01S 5/06* (2013.01); *G01S 5/14* (2013.01); *G08B 25/016* (2013.01); *G08B 21/0272* (2013.01); *G08B 21/0294* (2013.01)

(58) Field of Classification Search
USPC ...... 342/387, 444, 457, 463–465; 455/456.1, 455/457; 340/539.13, 545.1, 501
See application file for complete search history.

(56) References Cited

U.S. PATENT DOCUMENTS

| | | | |
|---|---|---|---|
| 5,365,516 A * | 11/1994 | Jandrell ................ | G01S 5/0009 340/991 |
| 6,233,459 B1 | 5/2001 | Sullivan et al. | |
| 6,710,719 B1 * | 3/2004 | Jones ........................ | G01S 5/14 340/10.2 |
| 2011/0140967 A1 * | 6/2011 | Lopez Pou .......... | A01K 11/008 342/450 |

* cited by examiner

Primary Examiner — Dao Phan
(74) Attorney, Agent, or Firm — Hayes Soloway PC

(57) ABSTRACT

A wireless alarm and location system and method of locating an object are provided. The system includes a transceiver contained within a housing enclosure. At least one activation element is located at least partially within the housing enclosure. At least a first omnidirectional signal is communicated from the transceiver upon activation of the activation element. An alarm and location element is positioned remote from the housing enclosure, wherein the alarm and location element receives the first omnidirectional signal and calculates a location of the housing enclosure.

19 Claims, 5 Drawing Sheets

ALARM AND LOCATION SYSTEM AND METHOD THEREOF

CROSS REFERENCE TO RELATED APPLICATION

This application is a continuation-in-part application of U.S. application Ser. No. 13/426,052 filed Mar. 21, 2012, the entire disclosure of which is incorporated herein by reference.

FIELD OF THE DISCLOSURE

The present disclosure is generally related to locating objects and more particularly is related to an alarm and location system and method of locating an object thereof.

BACKGROUND OF THE DISCLOSURE

Determining the location of an object or a person within or proximate to a structure is a feature that many industries, companies and individuals desire. Within various industries, determining the location of an object in a timely and accurate manner may save money and time, but may also minimize the risk of injury or a security breach. For example, in today's hospitals and medical facilities locating systems are used to determine the approximate location of infants and the elderly. When a baby is born, a security tag is attached to their leg to prevent abduction of the infant during their stay at the hospital. When an abductor attempts to remove the infant from the hospital, proximity sensors may signal an alarm to sound. Similar systems are used in nursing homes to prevent residents with mental handicaps from exiting the building without authorization. Many industries do not have locating systems in use, due to their expense and inconvenience in using them. For example, malls and shopping centers commonly only provide stationary maps with an indication of where the map is located relative to the building.

Beyond detecting a location of an object relative to a structure with a proximity sensor, it may be beneficial to provide security features with systems for locating human beings or objects. Human beings are presently exposed to many dangerous situations, some of which they are unable to avoid. For example, thousands of people a day experience some type of crime against them, such as a mugging, robbery, or assault. In addition, many people experience accidents, such as slip-and-falls caused by a perceived ability to multitask or inclement weather. When one experiences a dangerous situation, the need for assistance in the form of security or medical help is often needed. Conventional systems generally rely on a person's cell phone or closed circuit surveillance of an area where someone is likely to experience a dangerous situation. However, cell phones are often unavailable, whether due to theft or lack of signal, and surveillance video is wholly relying on the person monitoring the video.

Thus, a heretofore unaddressed need exists in the industry to address the aforementioned deficiencies and inadequacies.

SUMMARY OF THE DISCLOSURE

Embodiments of the present disclosure provide a wireless alarm and location system. Briefly described, in architecture, one embodiment of the system, among others, can be implemented as follows. The system includes a transceiver contained within a housing enclosure. At least one activation element is located at least partially within the housing enclosure. At least a first omnidirectional signal is communicated from the transceiver upon activation of the activation element. An alarm and location element is positioned remote from the housing enclosure, wherein the alarm and location element receives the first omnidirectional signal and calculates a location of the housing enclosure.

The present disclosure can also be viewed as providing a method of locating an object. In this regard, one embodiment of such a method, among others, can be broadly summarized by the following steps: providing at least one housing enclosure; activating at least one activation element located at least partially within the housing enclosure; upon activation of the activation element, transmitting at least a first omnidirectional signal from a transceiver contained within the housing enclosure; receiving the first omnidirectional signal from the transceiver in an alarm and location element positioned remote from the housing enclosure; and calculating a location of the housing enclosure based on the received first omnidirectional signal.

The present disclosure can also be viewed as providing a real-time locating security system. In this regard, one embodiment of such a system, among others, can be implemented as follows. A transceiver is contained within a housing enclosure, wherein the housing enclosure is substantially secured to a human being. At least two activation elements are located at least partially within the housing enclosure. At least a first omnidirectional signal is communicated from the transceiver upon activation of the at least two activation elements, wherein the at least two activation element are activated by the human being when the human being is in a state of fear. An alarm and location system is positioned remote from the housing enclosure, the alarm and location system having an alarm mode and a standby mode, wherein the alarm and location system is moved from the standby mode to the alarm mode when the first omnidirectional signal is received, and wherein the alarm and location system calculates a location of the housing enclosure. A notification element is in communication with the alarm and location system, wherein the notification element communicates an alarm message when the alarm and location system is in the alarm mode.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
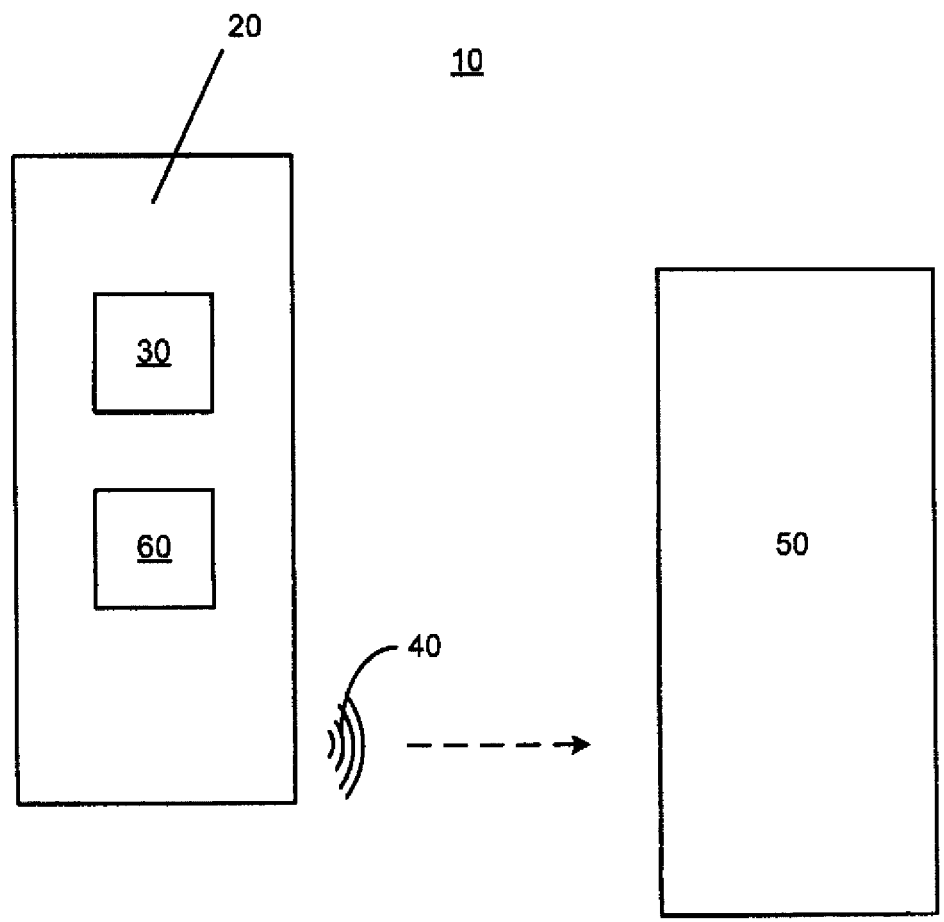
FIG. 1 is a block diagram illustration of a wireless alarm and location system, in accordance with a first exemplary embodiment of the present disclosure.

FIG. 1 is a block diagram illustration of a wireless alarm and location system 10, in accordance with a first exemplary embodiment of the present disclosure. The wireless alarm and location system 10, which may be referred to simply as 'system 10' includes a transceiver 60 contained within a housing enclosure 20. At least one activation element 30 is located at least partially within the housing enclosure 20. At least a first omnidirectional signal 40 is communicated from the transceiver 60 upon activation of the activation element 30. An alarm and location element 50 is positioned remote from the housing enclosure 20. The alarm and location element 50 receives the first omnidirectional signal 40 and calculates a location of the housing enclosure 20.

The system 10 may be used in a variety of industries where it is desirable to locate an object or a human being. It may be particularly useful in industries where it is necessary or advantageous to locate objects that are prone to substantial movement. In addition, the system 10 may be useful for providing security communication to a human being that is located a distance from emergency providers, or others who can assist the human being in an emergency, or when help is needed. For example, in many industries, such as the health care industry, it is desirable to know where a human being is located at a specific time, whether the human being is a doctor, nurse, medical staff member, patient, or other person within a medical facility. Conventional systems used within the health care industry, generally include devices that utilize a plurality of transmitters affixed to people or objects and a plurality of proximity sensors that sense when the transmitter is located nearby. These devices are commonly used to prevent the unauthorized transportation of an infant within a maternity ward of a hospital, or the unauthorized exit of an elder care facility by a resident, but may also be used for other purposes. Although these devices are successful at detecting the proximity of a transmitter to an access point, they fall short of providing a significant amount of other information that is pertinent to the location of the human or an object.

For example, conventional locating devices are only capable of determining a location of the transmitter relative to the proximity sensor. Accordingly, a proximity sensor on an exit or entrance doorway may be able to sense a nearby transmitter, but it is incapable of determining whether the transmitter is located on the exit side of the doorway or the entrance side of the doorway. Likewise, in a multi-story building, a doorway proximity sensor on the third floor may detect a transmitter that is located on the fourth floor, directly above the doorway proximity sensor's location on the third floor. This may result in many false positive determinations of locations, i.e., an indication that the transmitter is about to be moved through the doorway, when in fact it is not even on the same floor as the doorway. The system for locating an object 10 described in accordance with this disclosure may replace and/or work in conjunction with these conventional locating devices. Another shortcoming of the conventional systems is their ability to be used by the person wearing the transmitter to communicate the need for help or assistance in an emergency situation.

The present system 10 may be used in any industry, field, or setting, for any number of applications where locating and/or tracking a human being or an object is desirable. Primarily, the system 10 may provide significant benefits within the health care industry, including within hospitals, medical centers, doctors offices, nursing homes, retirement homes and any other medical facilities. The system 10 of the first embodiment, and all additional embodiments, are described in this disclosure in relation to large medical facilities, namely hospitals or large medical buildings. However, the system 10 may also be used in any other industry, such as the retail industry, entertainment industry, etc., without reservations.

The system 10 may be considered a real-time locating system (RTLS), which may be used to locate, track and identify an object in real time. In accordance with this disclosure, "real-time" as used with a RTLS may be characterized as occurring at substantially an actual and true time or event, or in occurrence with the specific time of an actual event occurring. In other words, the system 10 may be capable of determining a location of an object, such as a human being, in such a brief time period that the location of the object that the system 10 provides is substantially the same as the location of the object when it is first sensed or determined by the system 10. However, as those skilled in the art are aware, various factors may cause slight delays or insignificant changes in a RTLS system. These may include delays of fractions of a second due to computer processing, device functions, transmission times, and similar factors. These delays or changes in a RTLS are expected and do not hinder the functionality of the RTLS.

As is shown schematically in FIG. 1, the system includes a housing enclosure 20. The housing enclosure 20 is a portable structure that is carried by the human being in one way or another. For example, the housing enclosure 20 may include a key fob that is secured to a key ring or keychain, or a structure secured to a lanyard, bracelet, ID badge, etc., or any other type of portable enclosure. For example, the housing enclosure 20 may be a molded plastic or metal casing which sufficiently protects the contents of the housing enclosure 20, namely the transmitter 60 and the activation element 30, as will be discussed herein. The housing enclosure 20 may include any size, including a size that is small enough to conveniently fit within the pocket of a pair of pants, a purse, or within a shirt pocket.

At least one activation element 30 is located at least partially within the housing enclosure 20. The activation element 30 may be any type of element capable of being activated. For example, the activation element 30 may include a depressible button, which the human being can depress, or a remote activation instruction, whereby the activation element 30 is activated by a computer or a programmable device. Most commonly, and as described in this exemplary embodiment, the activation element 30 is a button, which is located within the exterior surface of the housing enclosure 20. Of course, the activation element 30 may include any feature or design that is commonly seen in buttons, such as labeling with text, graphics, and/or numbers, water or fluid proofing, textured buttons, etc. It is desirable for the activation element 30 to be located in a convenient place on the housing enclosure 20, such that a person needing to activate the activation element 30 can do so quickly.

The system 10 further includes a transceiver 60 that communicates a first omnidirectional signal 40 upon activation of the activation element 30. The transceiver 60 may include one or a variety of different types of circuits, transmitters, transmitting devices, computerized chips, computer-compatible chips, or other electronic circuitry. The number and type of circuits included with the transceiver 60 is dependent on the design and functionality of the transceiver 60, all of which are considered within the scope of the present disclosure. The transceiver 60 may be compatible with any of the applicable Institute of Electrical and Electronics Engineers (IEEE) standards and may be compatible with ultra-wideband (UWB) technology, wherein the locating circuit 20 may run on a low power supply, such as a small battery, and be used at low energy levels for short-range, high-bandwidth communications. For example, the locating circuit 20 may be compatible with IEEE 802.15.4a UWB, any WIFI™ enabled device, or any other communication medium. As an example, one type of transceiver 60 may be a 802.15.4a UWB chip.

The transceiver 60 may include many other characteristics or features to enhance the utility of the system 10. For example, the transceiver 60 may have a small size, thereby allowing it to fit within various housing enclosures 20, as discussed above. For example, this may include a transceiver 60 with a size of approximately 7.0 sq mm, but may also include sizes smaller or larger than 7.0 sq mm. The transceiver 60 may be small enough to be easily housed within the housing enclosure 20, which may then be attached to a human being with many types of fasteners, including adhesives, mechanical fasteners, hook and loop fasteners, with integral connections or any other connections or fasteners available. The transceiver 60 may also run on any type of power source, and may commonly only require a minimal amount of power that can be supplied by a battery. The transceiver 60 may run on any type of battery, including any electrochemical device such as button cell batteries, AAA, AA, 9V, or another type of battery. The battery may be rechargeable, non-rechargeable, replaceable or irreplaceable, depending on the design of the transceiver 60. Preferably, the transceiver 60 may use a very low amount of power, such as provided from a button cell battery or other type of battery, which may allow the transceiver 60 to be operational for substantially longer time than conventional chips. For example, the transceiver 60 may be operational for any number of hours, days, weeks or even years without replacing or recharging the battery, whereas some conventional chips may require recharging daily or weekly.

The first omnidirectional signal 40 is transmitted from the transceiver 60 to an alarm and location element 50. The first omnidirectional signal 40 may be transmitted at various times, but will most commonly be transmitted when the activation element 30 is activated. For example, when a user desires to transmit the first omnidirectional signal 40, the user may depress the button of the activation element 30 to do so. Other designs and configurations of the system 10 may include the first omnidirectional signal 40 being transmitted intermittently, periodically, or at predetermined intervals. For example, the transceiver 60 may be instructed, i.e., programmed with a computerized device, to transmit the first omnidirectional signal 40 every 10 seconds, every 60 seconds, or at any other interval of time.

The alarm and location element 50 may include a plurality of components and perform a plurality of functions. The alarm and location element 50 may be housed on a computer, server, or other computer-readable medium, that uses a processor and a plurality of computer-programmable code or software to carry out predefined instructions. Naturally, the alarm and location element may include any number of storage databases (harddrives), memory components (RAM), processors, operating systems, programs, displays, user interfaces, and the like. The alarm and location element 50 is positioned in a remote location from the housing enclosure 20, and commonly, will be positioned in a substantially stationary location, such as within a server room, or a room that houses various computers. In other words, the alarm and location element 50 may be positioned in any location, but may generally be positioned in a stationary location, whereas the housing enclosure 20 is a movable structure which is may be positioned virtually any distance from the alarm and location element 50. The alarm and location element 50 may also be positioned on a mobile device, such as a phone. With this understanding, the term, 'remote' is intended to simply mean that the alarm and location element 50 and the housing enclosure 20 are not physically connected to one another.

The alarm and location element 50 receives the first omnidirectional signal 40 that was transmitted by the transceiver 60 and calculates a location of the housing enclosure 20. Calculation of the location of the housing enclosure 20 may be completed in a number of ways, such as, for example, using various aspects of the first omnidirectional signal 40. For example, the alarm and location element 50 may receive, along with the first omnidirectional signal 40, a plurality of signal characteristics of the first omnidirectional signal 40 that can be used to calculate the location or position of the housing enclosure 20. These characteristics may include the signal strength, the time that the first omnidirectional signal 40 is sent and/or received, a difference in time of the first omnidirectional signal 40 transmission, including a duration of transmission time, etc., as will be discussed further herein.

The system 10, as a whole, may include a plurality of variations, as well as variations to components of the system 10. For instance, the activation element 30 is preferably activated by the human being that is in possession of the housing enclosure 20, such as by depressing a button of the activation element 30. For example, a large medical facility, such as a large hospital, may provide each of their staff members with a housing enclosure 20 having the transceiver 60 and the activation element 30. When a staff member leaves the hospital building, such as to go to their car for the drive home, or to walk to a public transportation station, the staff member may be susceptible to a dangerous situation. This may include unwanted harassment from another person, a slip and fall, a medical emergency, a crime, such as a mugging or an assault, or any other type of situation where the staff member desires to call for help.

When the staff member feels threatened or desires assistance, he or she may activate the activation element 30, such as by simply pressing the button of the activation element 30, which may then transmit the first omnidirectional signal 40. The alarm and location element 50 may receive the first omnidirectional signal 40, at which point a number of activities may occur. Primarily, it may be immediately advantageous for the location of the housing enclosure 20, and the staff member in possession of the housing enclosure 20, to be calculated. Once the location is known, assistance can be sent to that location or video surveillance can be activated, or a variety of other actions can be performed or initiated. Additionally, when the first omnidirectional signal 40 is received, the alarm and location element 50 may immediately communicate the need for assistance to security personnel, sound an audible or visual alarm, place a facility in lock-down mode, call law enforcement officers, or simply identify the staff member paired with the housing enclosure 20. Other actions of the alarm and location element 50, not specifically described herein, are also permissible, all of which are considered within the scope of the present disclosure.

Figure 2:
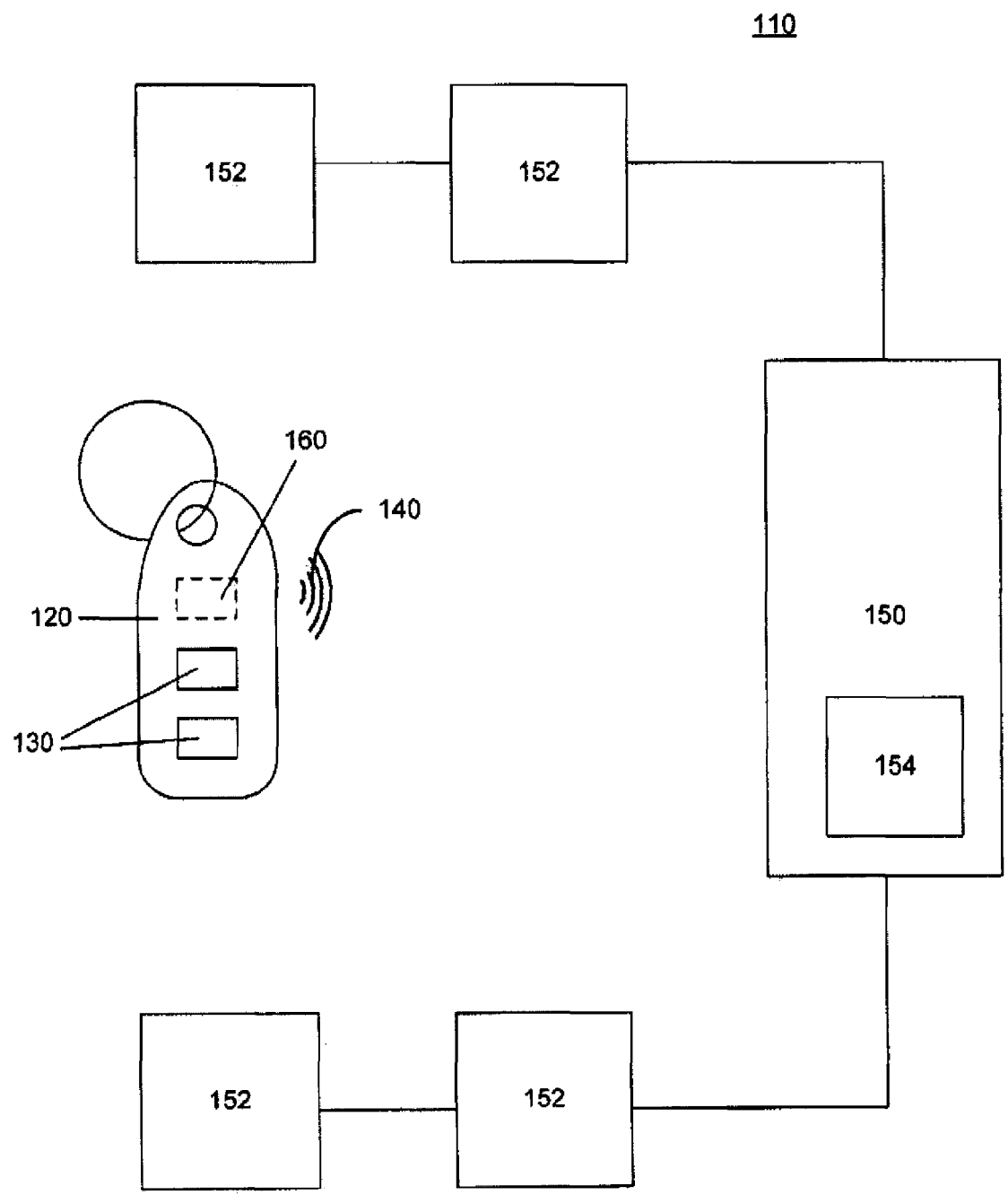
FIG. 2 is a block diagram illustration of the wireless alarm and location system, in accordance with a second exemplary embodiment of the present disclosure.

FIG. 2 is a block diagram illustration of the wireless alarm and location system 110, in accordance with a second exemplary embodiment of the present disclosure. The wireless alarm and location system 110 of the second exemplary embodiment, which may be referred to simply as, 'system 110,' is substantially similar to the system 10 of the first exemplary embodiment of FIG. 1. The system 110 includes a transceiver 160 contained within a housing enclosure 120. At least two activation elements 130 are located at least partially within the housing enclosure 120. At least a first omnidirectional signal 140 is communicated from the transceiver 160 upon activation of both of the activation elements 130. An alarm and location element 150 includes a plurality of monitoring units 152 that are positioned remote from the housing enclosure 120. Each of the plurality of monitoring units 152 is positioned in a different location. The first omnidirectional signal 140 is communicated from the transceiver 160 to the plurality of monitoring units 152. The alarm and location system 150 also includes a calculator 154 in communication with each of the plurality of monitoring units 152. The calculator 154 determines a duration of transmission time of the first omnidirectional signal 140 between the transceiver 160 and each of the monitoring units 152 and calculates a location of the housing enclosure 120 using the determined duration of transmission time for each of the transceiver 160 and the plurality of monitoring units 152.

In the second exemplary embodiment, at least two activation elements 130 are included within the housing enclosure 120, as depicted in FIG. 2. Accordingly, the two activation elements 130 may include depressible buttons that the human being can actuate. The use of two activation elements 130 that are both required to be activated at substantially the same time to transmit the omnidirectional signal 140 may provide benefits over the use of just one activation element 130. For example, when the housing enclosure 120 is located within a user's pocket or purse, one of the actuation elements 130 may be activated by accident, such as when another article in the pocket or purse depresses the button. The use of two activation element 130 allows for a more valid use of the system 110, in that there is less of a likelihood that two activation elements 130 will be activated than simply one activation element 130. Thus, the use of two activation elements 130 may prevent many accidental uses of the system 110, which may save time and money. Other solutions include depress and hold or multiple depressions of a single button or sensor.

When two activation elements 130 are used, it may be required to have them both activated at substantially the same time. This may generally be understood to mean that one of the activation elements 130 is in an activated state while the other activation element 130 is also in an activated state. For example, this may include a situation where both activation elements 130 are activated at exactly the same time, or a situation where one activation element 130 is activated and kept in an activated state, i.e., by keeping the button depressed, while the other activation element 130 is activated. In another design, the system 110 may include an activation element 130 that is activable by a remotely positioned device, such as a device that is integral with the alarm and location element 150. This may provide the benefit of remotely sending the first omnidirectional signal 140 if the person physically carrying the housing enclosure 120 is unable to do so.

The use of monitoring units 152 and a calculator 154 may further enhance the system 110 in comparison to the system 10 of the first exemplary embodiment. The monitoring units 152 are each located within a facility or in the surrounding terrain of a facility. For example, the monitoring units 152 may be located within a hospital, a parking garage, a covered walkway, or any other building. Additionally, the monitoring units 152 may be located external to a building or facility, or in a structure that is at least partially exposed to an outside atmosphere, such as outdoor walkways, outdoor areas, and any other indoor or outdoor location. As discussed previous, the system 110 is described herein in relation to health care facilities, such as hospitals, but the system 110 may be used with any facility, including retail facilities, entertainment facilities, enclosed facilities, semi-enclosed facilities, open-air facilities, or any other structure. Generally, the number of monitoring units 152 used with the system 110 will be dependent on the type and size of the facility, as well as the intended use of the system 110 and the volume of human beings being located. Any number of monitoring units 152 may be included with the system 110, as may depend on the design of the system 110. For example, small facilities may only require a small number of monitoring units 152, whereas larger, multi-storied facilities may require many monitoring units 152.

The monitoring units 152 may be located in a position that is remote from the transceiver 160. This may include any position that is at least a few centimeters from the transceiver 160, but may commonly include positions that are more than a few centimeters, more than a meter, more than 10 meters or more than a hundred meters from the transceiver 160. Any location of the monitoring unit 152 with respect to the transceiver 160 is considered within the scope of this disclosure, and the specific placement of the monitoring units 152 may vary depending on the size and type of the facility that they are located in. Locations may be indoors or outdoors, and each of the individual monitoring units 152 within the system 110 may have different locations from one another, which may include different distances to each other, placement on different floors of a structure, and/or placement at different heights on the same floor of a structure. Different locations may generally include locations where a substantial distance is present between individual monitoring units 152, such as 5 meters, 10 meters, 25 meters, 50 meters or any other distance. It may be advantageous for the distance between individual monitoring units 152 to be as great as possible, thereby reducing the number of monitoring units 152 within the system 110, which may decrease an overall cost of the system 110. The monitoring units 152 may be positioned in substantially stationary positions, such as affixed to the wall, ceiling or floor of a structure and may be located indoors or outdoors. However, semi-stationary positions may also be used, such as movable monitoring units 152 that can be kept stationary for a period of time while the system 110 is in use.

As discussed previously, the number of monitoring units 152 may vary depending on the design of the system 110. However, the number of monitoring units 152 may also correspond to the desired result of the system 110, such as the desired level of accuracy of the system 110. For example, using only two monitoring units 152 may allow the system 110 to calculate only a one-dimensional location of the transceiver 160 within the housing enclosure 120, not unlike a proximity sensor, whereas using only three monitoring units 152 may allow the system to calculate a two-dimensional location of the housing enclosure 120. Using three or more monitoring units 152 positioned in at least one plane depending on the software configuration, may allow the system 110 to calculate a three-dimensional location of the transceiver 160. The required number of monitoring units 152 relative to the dimensions sensed is based on the principle that determining a location of an object requires determining the location of one position relative to other defined reference positions. In other words, unambiguity of a determined or calculated location occurs in one-dimensional space with two reference points, in two-dimensional space with three reference points and in three-dimensional space with three or more reference points absent other constraints. Locating the housing enclosure 120 or transceiver 160 in four-dimensions may also be possible, as discussed with regards to tracking the location of the transceiver 160 over a period of time.

Furthermore, it is noted that it is possible to use monitoring units 152 in combination with constraints. For example, two monitoring units 152 may be used in combination with an algorithm that can be used to place restraints, constraints or limit positional possibilities. The algorithm restraints may be used, for example, to determine an upper ceiling or a bottom floor of the possibility of positions of the transceiver 160. The algorithm may also include a sensing of a direction of movement, rate of movement, or rate of force applied to the transceiver 160, among other sensed qualities. In this example, if two monitoring units 152 are used, the location of the transceiver 160 may be calculated based on a distance from each of the two monitoring units 152, which can be used to map possible locations of the transceiver 160 along intersecting spheres. The intersection of the spheres mapping the possible location of the transceiver 160 may circular or elliptical in shape, and when the algorithm is applied to that circular or elliptical shape, the possible positions of the transceiver 160 may be further narrowed. For instance, the transceiver 160 would not be location along a portion of the mapped path that is above an upper ceiling or below a bottom floor.

To provide an example of using the algorithm with two monitoring units 152, or more than two monitoring units 152, it is possible to include a transceiver 160 within a sporting item, such as a basketball or soccer ball. When the ball moves in a game between players and teams within a basketball court or field, the monitoring units 152 may identify its location. An algorithm may be used to identify the floor of the court or the field (bottom floor) and perhaps the ceiling of the court or an anticipated maximum height the ball will reach (upper ceiling). When the mapped circular or elliptical shape is positioned partially beyond the floor or the ceiling, the algorithm can exclude those portions from the possible locations of the basketball. Similarly, when it is detected that the basketball is moving between 0-5 feet off the floor of the court, an algorithm can be used to identify the movement as dribbling. The possibilities of identifying the position of the ball are numerous, since the use of the algorithm in combination with the monitoring units 152 and other sensors, e.g., accelerometers, can effectively calculate a position of the ball.

The ability to locate the housing enclosure 120 in three dimensions may have many utilities. In conventional systems using proximity sensors, a proximity sensor on one floor of a structure may detect the presence or proximity of a transmitter attached to an object on a different floor. For example, a proximity sensor positioned on a doorway on the fourth floor of a building, and controlling access through the doorway, may sense the proximity of an object on the third floor, and erroneously shut off access to the doorway on the fourth floor based on the sensed object on the third floor. This can cause inefficient and ineffective location monitoring, and may lead to many erroneous determinations, and ultimately, many security failures. Locating an object in three dimensions may prevent this erroneous determination, since the height of the object can be determined, and thus, an assessment of what floor the object is on can be made. Furthermore, locating an object in three dimensions may also allow the system 110 to determine if an object having a housing enclosure 120 has changed a height position, due to an external cause, such as falling down, being lifted up, etc. For example, this may allow the system 110 to determine if an elderly patient has fallen, or if an infant has been lifted out of a crib, as well as many other scenarios.

The system 110 may require the positions of the monitoring units 152 to be known positions, relative to the structure or facility that they're located in, and/or relative to one another. This may be achieved via any number of methods and devices, including determining the locations of the monitoring units 152, calculating the locations of the monitoring units 152 relative to one another, using a positioning device, such as Global Positioning System (GPS), or any other similar system. As discussed later, the positions of the monitoring units 152 may be known by other components of the system 110, such as the calculator 154, and may be used in calculating the position of the housing enclosure 120.

The system 110 uses the first omnidirectional signal 140, or alternatively, a plurality of omnidirectional signals that are communicated between the transceiver 160 and the plurality of monitoring units 152. The first omnidirectional signal 140 may include any type of signal characteristic, and may be transmitted at Ultra Wide Band (UWB) and WiFi™ frequencies, as well as other frequencies of other communication mediums. Preferably, transmission occurs between frequencies of between 3.244 GHz and 6.99 GHz and/or greater than 6.99 GHz. A frequency of at least 3.244 GHz may overcome absorption of the first omnidirectional signal 140 by various obstacles, namely portions of the human body. One of the uses of the system 110 is to determine the location of a human who has a transceiver 160 affixed to their person with a wristband or similar device. The position of the transceiver 160 proximate to the human's body may cause the body to absorb or delay some of or the entire first omnidirectional signal 140 depending on its frequency. Likewise, the location of a human body between the transceiver 160 and one of the monitoring units 152 may absorb some or the entire first omnidirectional signal 140. Absorption of the omnidirectional signal 140 may interfere with the timing of transmission of the first omnidirectional signal 140, which in turn, may affect the accuracy of the system 110. Other obstacles may also absorb the first omnidirectional signal 140, including building structures like walls and floors, large pieces of equipment, and other structures.

It has been determined through experimentation and testing that an omnidirectional signal 140 transmitted at a frequency of at least 3.244 GHz may overcome a substantial portion of any absorption of the first omnidirectional signal 140. Thus, transmitting the first omnidirectional signal 140 at a frequency of at least 3.244 GHz may allow the system 110 to function successfully. Furthermore, it has also been determined that transmitting the first omnidirectional signal 140 at a frequency of at least 3.244 GHz, or between 3.244 GHz and 6.99 GHz may overcome substantially all absorption of the first omnidirectional signal 140 by a human body, or other obstacles. Accordingly, the system 110 may emit the first omnidirectional signal 140 above 3.244 GHz, but preferably above 3.244 GHz, and more preferably between 3.244 GHz and 6.99 GHz. Transmission at or above 6.99 GHz may overcome substantially 100% of any biological signal absorption. Transmission of the first omnidirectional signal 140 at approximately 6.99 GHz may allow the system 110 to determine the location of the transceiver 160 within the housing enclosure 120 without interference from biological signal absorption. It is noted that other emission frequencies may also be used, including more precise frequency ranges or frequencies above 6.99 GHz, as may depend on the design and use of the system 110. Any frequency emission is considered within the scope of the present disclosure.

The first omnidirectional signal 140 may be communicated between the transceiver 160 and the plurality of monitoring units 152 in a variety of ways, including via one-way communications, two-way communications, three-way communications with another component of the system 110, or any other type of communication. For example, the first omnidirectional signal 140 may commonly be communicated or transmitted from the transceiver 160 to the plurality of monitoring units 152. In one of many alternatives, the plurality of monitoring units 152 may each transmit the first omnidirectional signal 140 to the transceiver 160. As can be seen, the first omnidirectional signal 140 may be transmitted from and received by either or both of the transceiver 160 and the monitoring units 152. The transceiver 160 and/or the plurality of monitoring units 152 may each include any number or type of receiver, transmitter and/or transceiver.

The system 110 may include many transceivers 160, each transmitting many first omnidirectional signals 140 to a plurality of monitoring units 152. For example, a plurality of transceivers 160 may be used in a structure where many human beings are desired to be located at the same or similar times. Each of the transceivers 160 may be carried on the person of the human being, and each may transmit a first omnidirectional signal 140 to any number of monitoring units 152. The plurality of monitoring units 152 may each transmit the first omnidirectional signal 140 to the plurality of transceivers 160, as the case may be. Any number of transceivers 160 and human beings may be located within the system 110, including 10, 50, hundreds or thousands of transceivers 160, which may be located simultaneously or at intervals, all of which are considered within the scope of the present disclosure.

The calculator 154 may include any number of computerized devices, having any type of processors and a variety of computerized programs capable of performing calculations. For example, the calculator 154 may include a computer program carrying out instructions on a computer processor. The calculator 154 may determine a duration of transmission time of the first omnidirectional signal 140 for each signal communication in a variety of ways, all of which may be capable of determining the duration of the transmission time of the first omnidirectional signal 140 between a start transmission time and an end transmission time, and between the components that the first omnidirectional signal 140 is being communicated between. For example, the calculator 154 may determine the duration of the transmission time for each first omnidirectional signal 140 that is transmitted from the transceiver 152 to each of the plurality of monitoring units 152, respectively. Thus, if a system 110 includes six monitoring units 152 and one transceiver 160, then the calculator 154 may determine six transmission time durations.

It is noted that the calculator 154 may determine any number of transmission time durations between any number of monitoring units 152 and locating circuits, which includes determining only the transmission time durations of a portion of the total transmitted first omnidirectional signals 140. For example, if a system 110 has one hundred (100) monitoring units 152, each receiving a first omnidirectional signal 140 from only one transceiver 160, the calculator 154 may determine some, all or any portion of the total number of transmitted first omnidirectional signal 140. Similarly, the calculator 154 may be capable of determining the transmission durations of a plurality of first omnidirectional signals 140 that are transmitted between a plurality of transceivers 160 and a plurality of monitoring units 152, respectively. The number of determinations that the calculator 154 makes may depend on the number of transmission durations required for calculating a location. Although only three or more monitoring units 152, and thus only three transmission durations, are needed for determining a location in three-dimensional space, additional transmission durations may be used to verify a calculated location.

The calculator 154 may determine the transmission durations in a number of ways. For example, the transceivers 160 may each include embedded firmware that calculates time on board, which may be used by the calculator 154 to calculate and triangulate a three-dimensional location based on the synchronized timing of the first omnidirectional signals 140 received. The firmware within the transceiver 160 may include data indicative of a time-stamp, such as a start time time-stamp of the transmission. When the first omnidirectional signal 140 is received at a monitoring unit 152, the monitoring unit 152 may place a second time-stamp on the first omnidirectional signal 140, indicative of a received time. Accordingly, a duration of transmission time may be calculated based on the time-stamps.

The calculator 154 determines the transmission durations in other ways too. For example, the calculator 154 may include software that is capable of facilitating two-way ranging between the transceivers 160 and the monitoring units 152, and/or real-time locating. Two-way ranging may include independently ranging three or more fixed monitoring units 152 with known locations to at least one transceiver 160. The calculator 154 may then calculate three distances, which define three circles to a point of intersection, which may be determined to be the location of the transceiver 160. Other ways may include using a Time Difference of Arrival (TDOA) scheme utilizing a clock that is synchronized between each of the monitoring units 152. In this design, each of the transceivers 160 may transmit the first omnidirectional signals 140 at predetermined intervals. Each of the monitoring units 152 may receive the transmitted first omnidirectional signals 140 and time-stamp them. To ensure accuracy within the system 110, clock synchronization must be completed, whereby the time-stamps of each of the first omnidirectional signals 140 received must be synchronized. The calculator 154 eventually calculates the position of the transceiver 160 based on the time-stamped first omnidirectional signals 140.

Another way to determine the duration of transmission time is by determining the precise duration of the transmission time for each of the first omnidirectional signals 140. For example, if the first omnidirectional signal 140 is received at three monitoring units 152, the calculator 154 may determine three durations of time, i.e., durations represented by variables a, b and c. As discussed above, this may be accomplished by programming the transceiver 160 to transmit the first omnidirectional signal 140 at a precise time, coordinating that precise time with the calculator 154, and then determining the duration of time between when the first omnidirectional signal 140 was transmitted and when it is received at each of the monitoring units 152. Alternatively, the first omnidirectional signal 140 may carry data indicative of a start transmission time. The calculator 154 may then determine a received or end transmission time at the monitoring unit 152 and compare the start and end times with each other. It is noted that the determined durations of transmission time may, in some instances, be the same duration. This may indicate that the transceiver 160 is located exactly halfway between two monitoring units 152.

In one of many alternatives, the calculator 154 may determine a difference in the duration of transmission time of the first omnidirectional signal 140 relative to one monitoring unit 152 of the plurality of monitoring units 152 and the duration of transmission time of the omnidirectional signal relative to another monitoring unit 152 of the plurality of monitoring units 152. For example, the calculator 154 may determine a first transmission duration, or a time of receiving the first omnidirectional signal 140 at one monitoring unit 152, and then compare that time with the times that other monitoring units 152 receive the first omnidirectional signal 140. In this case, the durations of transmission may be given in relative variables, i.e., $n_1$, $n_2$, $n_3$, etc., or a+$n_1$, a+$n_2$, a+$n_3$, etc., where variable a is the one determined transmission duration and each subscript n stands for the difference in time between receiving a at one monitoring unit 152 and each of the additional monitoring units 152.

It is contemplated that the system 110 may include a large number of human beings needing to use the system 110, each having a transceiver 160 within a housing enclosure 120 which they carry on their person, and each of the human beings needing to use the system 110 at substantially the same time. When determining the location of each of the human beings, the calculator 154 may need to make a significant number of measurements and/or determinations in a short period of time. For example, in many large hospitals, hundreds if not thousands of patients, medical and facility personnel, including doctors, nurses, technicians, secretaries, janitors, etc., may be located with the system 110. If only 100 of these people are desired to be located in one second, each using only one transceiver 160 and three monitoring units 152, three hundred calculations may need to be made in that one second. However, with larger facilities, tens or hundreds of monitoring units 152 may be used, which may compound the number of measurements that must be made. To limit the number of measurements, to limit computation or measurement time, the calculator 154 may be programmed, instructed or choose to only determine the transmission duration of the first omnidirectional signals 140 received at a specific monitoring unit 152. In other words, only a few of an available total monitoring units 152 may be required to determine the transmission duration of a first omnidirectional signal 140. This may be specified by a distance from the monitoring unit 152 to the transceiver 160, a carrying load of the monitoring unit 152, the number of transceivers 160 in a given area, or other factors.

The calculator 154 is in communication with each of the plurality of monitoring units 152 and calculates a location of the transceiver 160 using the determined duration of transmission time for each of the plurality of monitoring units 152 and the transceiver 160. Communication to and from the calculator 154 may include any communication system and the calculator 154 may include or be embedded with any device capable of performing one or more calculations. This may include a computerized device having a processor that runs a quantity of computer-readable code, where the code may have instructions for performing the calculations, such as a personal computer (PC) or a server. The calculations that the calculator 154 makes may be substantially based off of the determined transmission durations for the first omnidirectional signal 140. The calculator 154 may compare the different transmission durations, and determine a location of the transceiver 160 that the first omnidirectional signal 140 was transmitted from. As discussed previously, the location of the transceiver 160 may be expressed in a variety of ways, including in one, two or three dimensions to an accuracy at or beyond at least 0.1 meters of a true location of the transceiver 160.

The calculator 154 may calculate the location of the locating circuit using one or more timing algorithms. A timing algorithm may be variable-based expression that provides a numerical representation of a location based off of inputs the determined transmission durations from each of the plurality of monitoring unit 152 and known mathematical concepts. This essentially eliminates the need for conventional methods and systems for determining a location, including pinging, RFID based systems, ultrasonic systems or radar systems, that rely on the timing of a returned transmission signal. The system 110 ultimately determines the location of the transceiver 160 with the determined transmission durations, or a comparison thereof. Accordingly, determining the transmission durations to a precise degree is necessary for accuracy within the system 110. The timing algorithms may allow the system 110 to determine the location of the transceiver 160 to a high degree of accuracy, such as within 10 cm in a three-dimensional space. However, the system 110 is capable of accuracy to any degree, including those less than or greater than 10 cm in a three-dimensional space.

In use, the calculator 154 may calculate the location of the transceiver 160 at any time, but may specifically calculate the location of the transceiver 160 when the first omnidirectional signal 140 is transmitted. It should be recognized that the system 110 is capable of calculating the location relative to a navigatable structure. Accordingly, the system 110 could calculate the location of the transceiver 160 at predetermined intervals and detect when the transceiver 160 is located proximate to a ground surface, such as the floor surface of a building or a ground surface exterior to the building.

It is noted that any of the abovementioned features may be carried out on any number of calculators 154 that are embedded with various components of the system 110. The inclusion of the calculator 154 in the system 110 is for clarity in describing the present disclosure, and that a calculating function is inherently included within the system 10 of the first exemplary embodiment. Accordingly, the calculator 154 of the system 110 may be understood as an identification of the inherent calculating component of the system 10 of FIG. 1. The calculator 154 may actually include a plurality of calculating devices. For example, the portion of the calculator 154 that determines transmission durations may be distinct or separate from the portion of the calculator 154 that determines a location based on the transmission durations. Similarly, other processes and steps within the system 110 may be carried out by the plurality of monitoring units 152, the transceiver 160, and/or the calculator 154, or any combination thereof. Any of these components may include any number of computerized processors, storage databases or software, as may be dependent on the design of the system 110. Accordingly, any variations to the system 110 as described herein are considered within the scope of the present disclosure.

Figure 3:
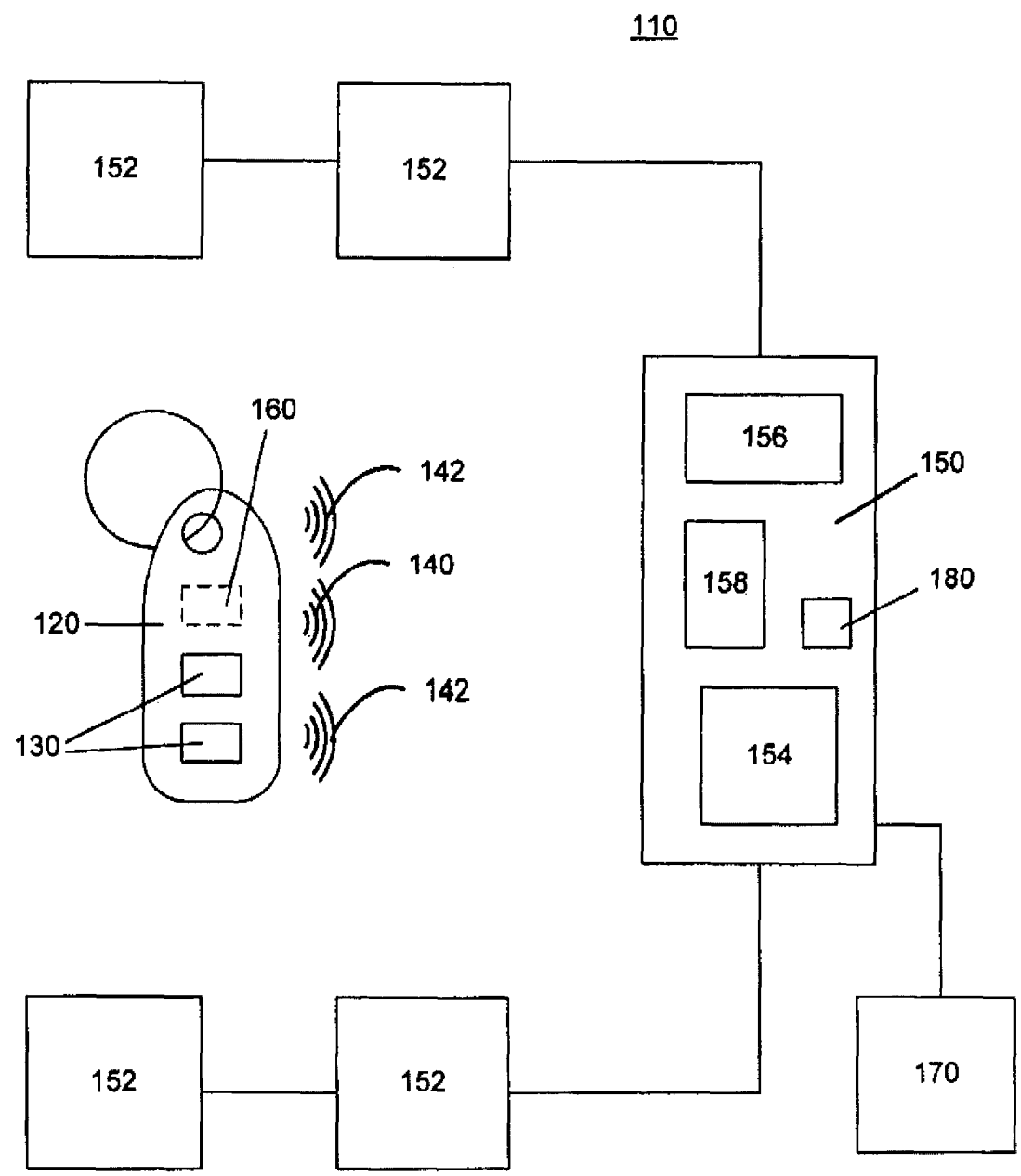
FIG. 3 is a block diagram illustration of a wireless alarm and location system, in accordance with the third exemplary embodiment of the present disclosure.

FIG. 3 is a block diagram illustration of a wireless alarm and location system 110, in accordance with the second exemplary embodiment of the present disclosure. In FIG. 3, the system 110 is depicted having the first omnidirectional signal 140 as well as at least a second omnidirectional signal 142. As described previously, the first omnidirectional signal 140 may be transmitted from the transceiver 160 when the activation element(s) 130 is activated. Any additional number of omnidirectional signals 142 may also be transmitted from the transceiver 160, preferably at predetermined intervals. The transmission of the second omnidirectional signals 142 at these intervals may be referred to as a 'heartbeat,' since the signals are transmitted at a steady rate. The second omnidirectional signal 142 may have a different signal characteristic from the first omnidirectional signal 140, such that the system 110 can identify the different between the two. For example, the signal characteristic may include a different signal frequency, a different signal pattern, or any other characteristic associated with a signal that may differentiate one signal from another. The use of both the first omnidirectional signal 140 and the second omnidirectional signals 142 allows for the system 110 to determine a person's location when they activate the activation element 130, but also determine and track their location when they do not activate the activation element 130. For example, every time the second omnidirectional signals 142 are transmitted, the alarm and location element 150 may record the signal time and calculate the location of the transceiver 160 at that time. These locations can be mapped to show where the transceiver 160 has been located—a concept often referred to as 'bread-crumbing.'

To allow for tracking or 'bread-crumbing' within the system 110, the alarm and location element 150 may include a tracking element 156. The tracking element 156 may include a database where the transmission data of the second omnidirectional signals 142 is stored or recorded. The calculator 154, or another component of the alarm and location element 150 may then calculate a location of the housing enclosure 120 based on the received second omnidirectional signals 142. As can be seen, the tracking element 156 may be beneficial in providing historical information on the location of a person and the movements of the person. For instance, the tracking element 156 could indicate if a person has accessed restricted areas of the medical facility.

To allow for convenient use of the system 110, the alarm and location element 150 may output any calculated location of the housing enclosure 120 on a graphical user interface (GUI) 170, which may include any type of display, including a display monitor, a PDA, a smart phone, or a printed graphical display. It may also be preferable to display the location of the housing enclosure 120 on the GUI 170 relative to a graphical depiction of a terrain, which may include any indoors or outdoors terrain. The use of the GUI 170 may be included with any design of the system 110, which includes all embodiments of the disclosure discussed herein.

The GUI 170 may depict the person having the transceiver 160 in the location that the system 110 determines the person to be in. For example, the person may be within a room and located near an exterior wall and standing on a ground surface or floor. Other locations may also be depicted in the GUI 170, such as those in relation to a room number, a floor number, a structure sector or department, a coordinate within the structure or a room thereof, or any other location. The type and style of the graphical depiction of a GUI 170 may depend on the type of structure, terrain, or surrounding environment of the setting where the system 110 is used. For example, the GUI 170 may include a three-dimensional depiction of a structure whereby a user of the system 110 can rotate, move or navigate through the depiction. The GUI 170 may also be aerial view two-dimensional depictions or cross-sectional two-dimensional depictions.

In accordance with the second exemplary embodiment, the alarm and location element 150 may also include a notification element 158. The notification element 158 may be a device or computerized program that issues a notification of an alarm or the location of the housing enclosure 120. For example, the notification element 158 may communicate an alarm message when the alarm and location element 150 receives the first omnidirectional signal 140. Alternatively, the notification element 158 may also notify any third parties of activity on the system 110, such as by calling the police when a first omnidirectional signal 140 is received, or notifying a security entity. The notification or alarm message issued by the notification element 158 is not limited to any specific message or alarm. Rather, it may include any audible, textual, graphical, or visual message, which may include any type of graphic, text, message, action, request, or information needed. All types of messages and alarms are considered within the scope of the present disclosure.

When the system 110 is used by a person, he or she may activate the activation elements 130 when he or she is in a state of fear. For example, when the person is being attacked by another, or has encountered a dangerous situation, or for whatever reason desires to call for help. When the person does activate the activation element 130, the alarm and location element may be placed in an alarm mode. The alarm mode may simply be a mode of the system 110 where a first omnidirectional signal 140 has been received and further action is necessary. When the system 110 is not being used, or when there are no first omnidirectional signals 140 being received, the alarm and location element 150 may be in standby mode. The system 110 may be programmed to perform or not perform actions in either the standby mode or the alarm mode. For example, the alarm and location element 150 may be moved from the standby mode to the alarm mode when the first omnidirectional signal 140 is received. When in the alarm mode, the alarm and location element 150 may be programmed to immediately calculate the location of the housing enclosure 120 from which the first omnidirectional signal 140 was received, or all housing enclosures 120 in current use.

The system 110 may also include an identification element 180 in communication with the alarm and location element 150. The identification element 180 may contain an identified correspondence between the housing enclosure 120 and an identity of the human being that posses the housing enclosure 120. For example, the identification element 180 may store information within the system 110 that shows that a housing enclosure 120 having a specific serial number is assigned or used by a specific person. Accordingly, the identification element 180 allows the system 110 to keep track of who has which housing enclosure 120, but also allows the system 110 to recognize that a specific person is in need of assistance.

Naturally, the various components of the system 110 may provide enhanced use of the system 110. For example, the GUI 170 may further include one or more identification markings from the identification element 180 that are assigned to the housing enclosure 120. This may include a tag containing identification information that is visible on the GUI 170, and which is assigned to the person or the housing enclosure 120. This may allow a person monitoring the system 110 to visually determine which person is located in what place. Other identification tags may also be used, such as virtual tags with names, descriptions, ID number, reference number or any other identification characteristic. When a system 110 includes multiple people being located with multiple transceivers 160, identification tags may become necessary to decipher between each of the people and/or transceivers 160, respectively.

Figure 4:
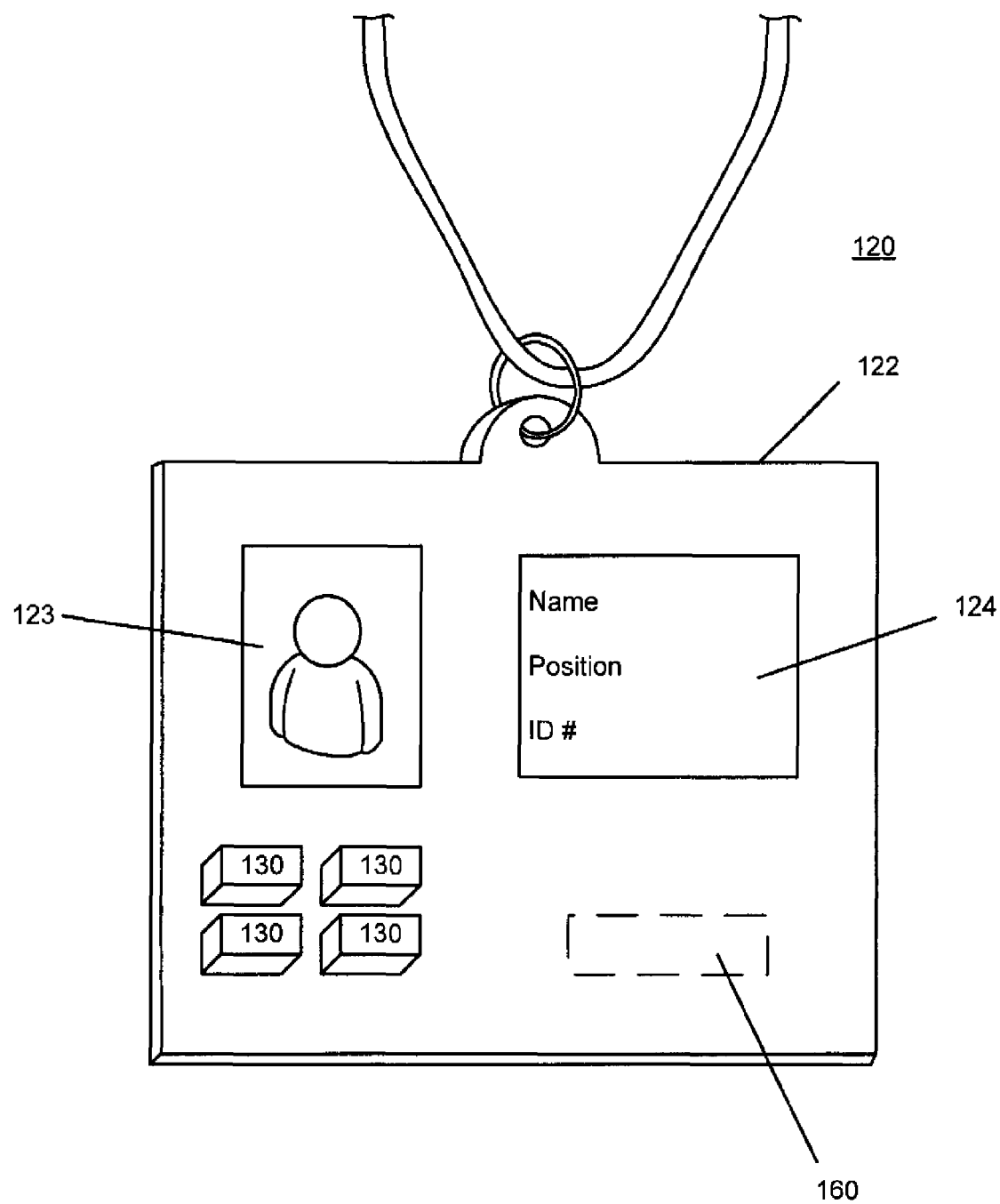
FIG. 4 is an illustration of a housing enclosure of the wireless alarm and location system, in accordance with the second exemplary embodiment of the present disclosure.

FIG. 4 is an illustration of a housing enclosure 120 of the wireless alarm and location system 110, in accordance with the second exemplary embodiment of the present disclosure. The housing enclosure of FIG. 4 may include an ID badge 122 or ID card that is conventionally worn by an employee of a medical facility, or virtually any other type of facility. The ID badge 122 may be retained on a person with a lanyard or other device, including a biased fastener or a hook and loop fastener. The ID badge 122 may include a person's picture 123, and a person's identity data 124. For example, the identity data 124 may include the person's name, position and/or serial or ID number. The ID badge 122 may conveniently house the activation elements 130 and the transceiver 160. Since many staff members or employees currently wear ID badges 122, the inclusion of some of the system 110 components, namely the activation elements 130 and the transceiver 160, is a convenient way to incorporate the system 110 into current practices.

Figure 5:
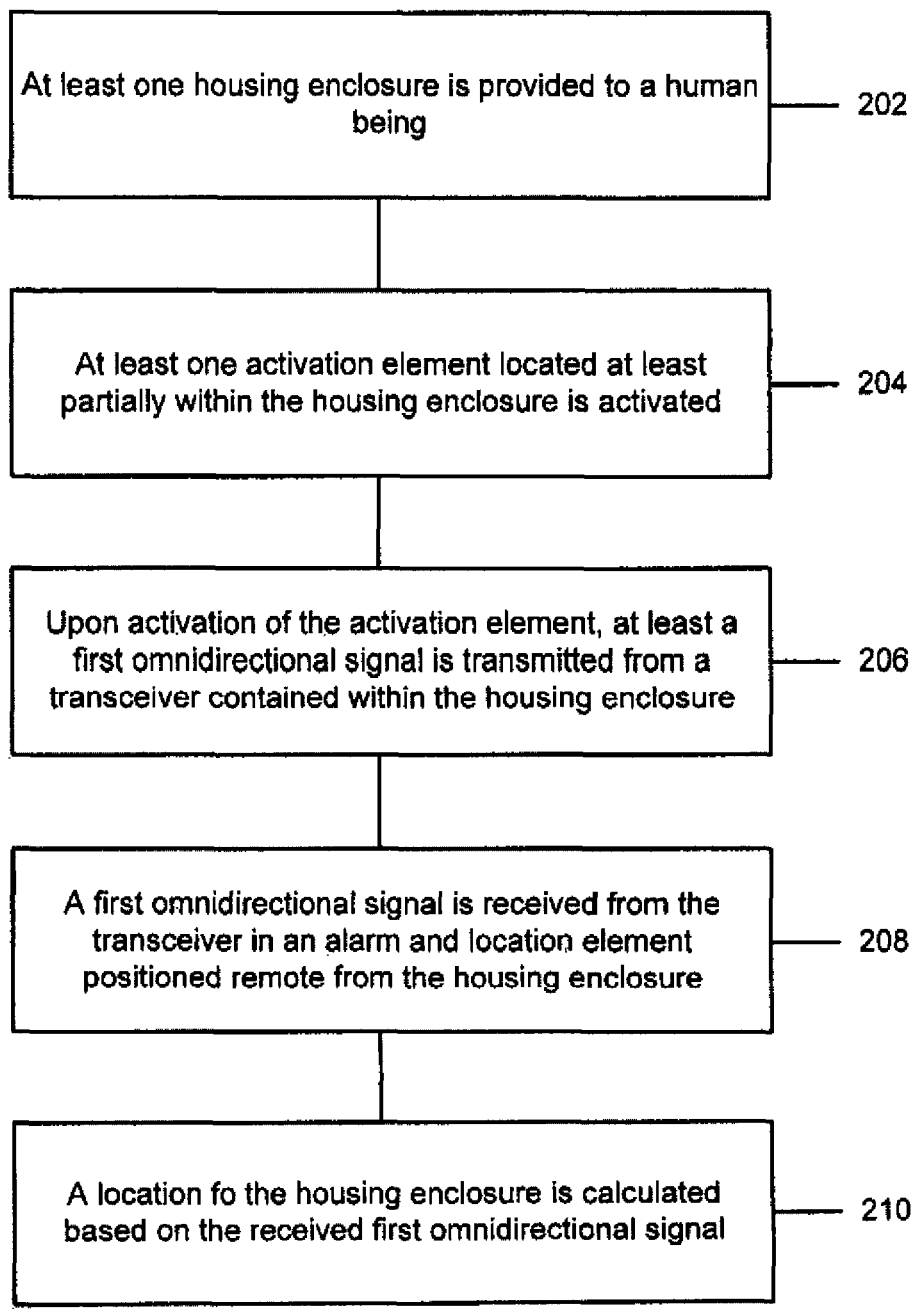
FIG. 5 is a flowchart illustrating a method of locating a human being, in accordance with the first exemplary embodiment of the disclosure.

FIG. 5 is a flowchart 200 illustrating a method of locating a human being, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

At block 202, at least one housing enclosure 20 is provided to a human being or object. At least one activation element 30 located at least partially within the housing enclosure 20 is activated (block 204). Upon activation of the activation element 30, at least a first omnidirectional signal 40 is transmitted from a transceiver 60 contained within the housing enclosure 20 (block 206). A first omnidirectional signal 40 is received from the transceiver 60 in an alarm and location element 50 positioned remote from the housing enclosure 20 (block 208). A location of the housing enclosure 20 is calculated based on the received first omnidirectional signal 40 (block 210).

The method may also include any number of additional steps, processes, or variations thereof, including any functions, processes or actions described with respect to FIGS. 1-4. For example, the method may further include the step of remotely positioning a plurality of monitoring units from the housing enclosure, wherein each of the plurality of monitoring units is positioned in a different location, wherein the first omnidirectional signal is communicated from the transceiver to the plurality of monitoring units. A duration of transmission time of the first omnidirectional signal between each of the monitoring units and the transceiver may be determined. A location of the housing enclosure may be calculated using the determined duration of transmission time of the omnidirectional signal from the transceiver to each of the monitoring units. The calculated location of the housing enclosure may be graphically displayed relative to a graphical depiction of a terrain.

Furthermore, an alarm message may be communicated when the alarm and location element receives the first omnidirectional signal. The alarm and location element may be set to an alarm mode when the first omnidirectional signal is received. Additionally, the alarm and location element may be programmed to control an expiration of use for the transceiver. The method may further include steps for tracking the location of a person with a second omnidirectional signal. For example, at least a second omnidirectional signal may be intermittently transmitted from a transceiver contained within the housing enclosure at predetermined intervals. The second omnidirectional signal may then be received at a tracking element in communication with the alarm and location element. From here, the location of the housing enclosure may be calculated based on the received second omnidirectional signal.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A wireless alarm and location system comprising:
   a transceiver contained within a housing enclosure;
   at least one activation element located at least partially within the housing enclosure;
   at least a first omnidirectional signal communicated from the transceiver upon activation of the activation element;
   an alarm and location element positioned remote from the housing enclosure, wherein the alarm and location element receives the first omnidirectional signal and calculates a location of the housing enclosure; and
   at least a second omnidirectional signal intermittently communicated from the transceiver at predetermined intervals, wherein the second omnidirectional signal has a signal characteristic different from the first omnidirectional signal.

2. The wireless alarm and location system of claim 1, wherein the activation element is activable manually.

3. The wireless alarm and location system of claim 1, wherein the activation element is activable by an activation device positioned remotely from the housing enclosure.

4. A wireless alarm and location system comprising:
   a transceiver contained within a housing enclosure;
   at least one activation element located at least partially within the housing enclosure;
   at least a first omnidirectional signal communicated from the transceiver upon activation of the activation element;
   an alarm and location element positioned remote from the housing enclosure, wherein the alarm and location element receives the first omnidirectional signal and calculates a location of the housing enclosure, wherein the alarm and location element further comprises:
   a plurality of monitoring units positioned remote from the housing enclosure, each positioned in a different location, wherein the first omnidirectional signal is communicated from the transceiver to the plurality of monitoring units; and a calculator in communication with each of the plurality of monitoring units, wherein the calculator determines a duration of transmission time of the first omnidirectional signal between the transceiver and each of the monitoring units and calculates a location of the housing enclosure using the determined duration of transmission time for each of the transceiver and monitoring units.

5. The wireless alarm and location system of claim 4, further comprising a graphical interface in communication with the alarm and location element, wherein the calculated location of the housing enclosure is displayed on the graphical interface relative to a graphical depiction of a terrain.

6. The wireless alarm and location system of claim 1, wherein the at least one activation element further comprises at least two activation elements located at least partially within the housing enclosure.

7. The wireless alarm and location system of claim 6, wherein the first omnidirectional signal is communicated from the transceiver upon activation of at least a portion of the at least two activation elements.

8. The wireless alarm and location system of claim 4, further comprising at least a second omnidirectional signal intermittently communicated from the transceiver at predetermined intervals, wherein the second omnidirectional signal has a signal characteristic different from the first omnidirectional signal.

9. The wireless alarm and location system of claim 1, further comprising a tracking element in communication with the alarm and location element, wherein the tracking element receives the second omnidirectional signal from the transceiver, wherein the alarm and location element calculates a location of the housing enclosure based on the received second omnidirectional signal.

10. The wireless alarm and location system of claim 1, wherein the location of the locating circuit is expressed in three dimensions.

11. The wireless alarm and location system of claim 1, wherein the alarm and location element further comprises a notification element, the notification element communicating an alarm message containing the calculated location of the housing enclosure when the alarm and location element receives the first omnidirectional signal.

12. The wireless alarm and location system of claim 1, further comprising an identification element in communication with the alarm and location element, the identification element containing an identified correspondence between the housing enclosure and an identity manually.

13. A method of locating an object comprising the steps of:
providing at least one housing enclosure;
activating at least one activation element located at least partially within the housing enclosure;
upon activation of the activation element, transmitting at least a first omnidirectional signal from a transceiver contained within the housing enclosure;
receiving the first omnidirectional signal from the transceiver in an alarm and location element positioned remote from the housing enclosure;
calculating a location of the housing enclosure based on the received first omnidirectional signal; and
remotely positioning a plurality of monitoring units from the housing enclosure, wherein each of the monitoring units is positioned in a different location, wherein the first omnidirectional signal is communicated from the transceiver to the plurality of monitoring units;
determining a duration of transmission time of the first omnidirectional signal between each of the monitoring units and the transceiver; and
calculating a location of the housing enclosure using the determined duration of transmission time of the omnidirectional signal from the transceiver to each of the monitoring units.

14. The method of claim 13, further comprising the step of communicating an alarm message containing the calculated location of the housing enclosure when the alarm and location element receives the first omnidirectional signal.

15. The method of claim 13, further comprising the step of graphically displaying the calculated location of the housing enclosure relative to a graphical depiction of a terrain.

16. The method of claim 13, further comprising the step of setting the alarm and location element in an alarm mode when the first omnidirectional signal is received.

17. The method of claim 13, further comprising the step of programming the alarm and location element to control an expiration of use for the transceiver.

18. The method of claim 13, further comprising the steps of:
transmitting at least a second omnidirectional signal intermittently from a transceiver contained within the housing enclosure at predetermined intervals, wherein the second omnidirectional signal has a signal characteristic different from the first omnidirectional signal;
receiving the second omnidirectional signal at a tracking element in communication with the alarm and location element; and
calculating a location of the housing enclosure based on the received second omnidirectional signal.

19. A real-time locating security system comprising:
a transceiver contained within a housing enclosure, wherein the housing enclosure is substantially secured to a human being;
at least two activation elements located at least partially within the housing enclosure;
at least a first omnidirectional signal communicated from the transceiver upon activation of at least a portion of the at least two activation elements;
an alarm and location system positioned remote from the housing enclosure, the alarm and location system having an alarm mode and a standby mode, wherein the alarm and location system is moved from the standby mode to the alarm mode when the first omnidirectional signal is received, and wherein the alarm and location system calculates a location of the housing enclosure; and
a notification element in communication with the alarm and location system, wherein the notification element communicates an alarm message containing the calculated location of the housing enclosure when the alarm and location system is in the alarm mode.

* * * * *